US008699336B2

(12) United States Patent
Huo

(10) Patent No.: US 8,699,336 B2
(45) Date of Patent: Apr. 15, 2014

(54) METHOD AND SYSTEM FOR IMPLEMENTING RELAY CHANNEL, AND EDGE NODE

(75) Inventor: Jing Huo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 166 days.

(21) Appl. No.: 13/132,102

(22) PCT Filed: Sep. 1, 2009

(86) PCT No.: PCT/CN2009/073668
§ 371 (c)(1),
(2), (4) Date: Aug. 1, 2011

(87) PCT Pub. No.: WO2010/063186
PCT Pub. Date: Jun. 10, 2010

(65) Prior Publication Data
US 2011/0283308 A1    Nov. 17, 2011

(30) Foreign Application Priority Data
Dec. 1, 2008    (CN) .......................... 2008 1 0218056

(51) Int. Cl.
*H04L 12/28*    (2006.01)
*G06F 15/173*    (2006.01)

(52) U.S. Cl.
USPC .................... 370/230.1; 709/226; 725/120

(58) Field of Classification Search
USPC .................. 370/352, 390, 230.1; 725/95, 120
See application file for complete search history.

(56) References Cited

U.S. PATENT DOCUMENTS

| 2005/0091399 | A1 | 4/2005 | Candan et al. ................ 709/238 |
| 2005/0289618 | A1* | 12/2005 | Hardin ............................. 725/95 |
| 2007/0058626 | A1* | 3/2007 | Keller et al. ................... 370/390 |
| 2007/0147347 | A1* | 6/2007 | Ristock ......................... 370/352 |

FOREIGN PATENT DOCUMENTS

| CN | 101039329 A | 9/2007 | ............. H04L 29/08 |
| CN | 101252549 A | 8/2008 | ............. H04L 12/56 |
| CN | 101431535 A | 5/2009 | ............. H04L 29/08 |
| WO | WO2007/006178 A1 | 1/2007 | ............. H04J 13/00 |
| WO | WO2008/034352 A1 | 3/2008 | ............. H04L 29/06 |

OTHER PUBLICATIONS

Kim, Hyun-Cheol, e al., "An MPEG-4 Compliant Interactive Multimedia Streaming Platform Using Overlay Networks", ETRI Journal, vol. 28, No. 4, Aug. 2006, pp. 411-424.

* cited by examiner

*Primary Examiner* — Habte Mered
*Assistant Examiner* — Mahmoud Ismail
(74) *Attorney, Agent, or Firm* — Christopher P. Maiorana, PC

(57) ABSTRACT

The invention relates to a method and system for implementing a relay channel, and an edge node, in which a media location service system monitors the number of orders of all nodes in an IPTV system, and, when monitoring that the number of orders of the central node of the IPTV system is more than a predetermined first threshold, searches edge nodes with the number of orders less than a predetermined second threshold, and sends a relay channel establishing request message to one of the edge nodes; the edge node which receives the message sends an RTSP link establishing request message to the central node, reserves a media distribute unit (MDU) resource for the link, and notifies the central node of the IP address of the reserved MDU resource; and the edge node enables the MDU resource, sends a media stream requesting message to the central node, and stores data of the relay channel. The invention can better balance the load of each node in the network, thereby allocating and using the system resource more properly.

4 Claims, 1 Drawing Sheet

METHOD AND SYSTEM FOR IMPLEMENTING RELAY CHANNEL, AND EDGE NODE

TECHNICAL FIELD OF THE INVENTION

The invention relates to the field of Internet Protocol television (IPTV for short), in particular to a method and system for implementing a relay channel, and an edge node.

BACKGROUND OF THE INVENTION

An IPTV transmits messages including television, video, text, graphics, data and so on over an IP network, and provides a manageable multimedia service of quality of service/quality of experience (QoS/QoE for short) assurance, security, interaction and reliability. That is, the IPTV is a manageable multimedia service needing the QoS and security assurance, which is obviously different from those uncontrollable and unmanageable stream media applications with no assurance in the QoS and security on the Internet.

A real time streaming protocol (RTSP for short) defines how a one-to-multiple application program effectively transmits multimedia data over the IP network, sets up and controls one or more time-synchronous continuous stream media, such as audio and video. The RTSP is above a real-time transport protocol (RTP for short) and a real-time transport control protocol (RTCP for short) in the architecture and provides a network remote control function for multimedia servers.

As shown in FIG. 1, an IPTV system includes a media location service system (MLSS for short) and nodes, wherein the MLSS is used for monitoring the number of orders of each node; and the node is actually a universal service server (USS for short) including a service module, an adaptation module, a database module and a media distribution unit (MDU for short). The nodes are classified into a central node and an edge node, and the difference between them is that contents to be distributed are normally provided and stored on the central node, then distributed to the edge node by using a distribution technology. Obviously, for the IPTV system, the central node and the edge node are different in function, and how to relieve the load of the central node to balance the network load has become an important task.

At present, there are two ways for network load balancing:
1) global service load balancing (GSLB for short)

A request of a user is directed to a nearest node within the scope of the whole network, and the main characteristic of the GSLB lies in a proximity determination.

2) local service load balancing (or service load balancing, SLB for short)

This way is limited to a certain area, aiming at searching for a most suitable node within a specific area to provide services. The decisions of the local service load balancing are made mainly based on running status such as health, load situation and supported media format of a node.

Neither of the two ways above solves the problem of balancing load of a channel (for example, a channel has a high order rate).

SUMMARY OF THE INVENTION

Based on the technical problem above, the invention provides a method and system for implementing a relay channel, and an edge node. The method can establish a relay channel conveniently and quickly to relieve problems of overload and low efficiency of the central node, and can better balance the load of each node in the network, thereby allocating and using the system resource more properly.

According to one aspect of the invention, a method for implementing a relay channel is provided.

According to the method for implementing a relay channel, in which a media location service system (MLSS) monitors the number of orders of all nodes of an Internet Protocol television (IPTV) system, when the MLSS monitors that the number of orders of a central node is more than a predetermined first threshold, the following steps are executed:

step 1: the MLSS searching for edge nodes with the number of orders less than a predetermined second threshold, and sending a relay channel establishing request message to one of the edge nodes;

step 2: the edge node which receives the relay channel establishing request message sending an RTSP link establishing request message to the central node, reserving a media distribute unit (MDU) resource for the link after receiving an acknowledgement message returned by the central node, and notifying the central node of an IP address of the reserved MDU resource; and step 3: the edge node enabling the MDU resource, sending a media stream requesting message to the central node, and storing data of the relay channel after receiving an acknowledgement message returned by the central node, then the relay channel being successfully established.

In step 2, after receiving the acknowledgement message returned by the central node, the edge node applies to a database module of the edge node for reserving the MDU resource, and the database (DB) module reserves the MDU resource for the edge node and returns an acknowledgement message carrying the IP address of the reserved MDU resource.

Between steps 2 and 3, the method further comprises: the central node returns the acknowledgement message to the edge node after receiving the notification from the edge node.

In step 3, the edge node enables the MDU resource by the following steps:

step a: a service module of the edge node sending an MDU resource enabling request message to an adaptation module of the edge node;

step b: the adaptation module enabling the MDU resource, and an MDU to which the MDU resource belongs returning an acknowledgement message to notify the adaptation module of successful enabling of the corresponding resource; and step c: the adaptation module returning an acknowledgement message to the service module to notify the service module of successful enabling of the corresponding MDU resource.

Moreover, in step 3, after receiving the media stream requesting message from the edge node, the central node returns the acknowledgement message, and at the same time, starts to send a media stream to an MDU corresponding to the IP address notified by the edge node.

The method of the invention can establish a relay channel conveniently and quickly to relieve problems of overload and low efficiency of the central node and better balance the load of each node in the network, thereby allocating and using the system resource more properly. The invention is suitable for the circumstance in the actual operation that the large amount of users and heavy load of the central node make it necessary to establish a relay channel on an edge node for sharing the load.

Other features and advantages of the present invention will be described in the following description and partly become obvious from the description, or be understood by implementing the present invention. The objects and other advantages of the present invention can be realized and obtained through the structures indicated by the description, claims and drawings.

BRIEF DESCRIPTION OF THE DRAWINGS

The drawings are intended to provide a further understanding of the invention, and constitute one part of the specification. The drawings are used to explain the present invention together with the embodiments of the present invention without unduly limiting the scope of the present invention, wherein.

DETAILED DESCRIPTION OF THE EMBODIMENTS

Functional Overview

One embodiment of the invention uses a method for implementing a relay channel, wherein an MLSS searches for edge nodes with the number of orders less than a predetermined second threshold, and sends a relay channel establishing request message to one of the edge nodes; the edge node which receives the relay channel establishing request message sends an RTSP link establishing request message to the central node, reserves a media distribute unit (MDU) resource for the link after receiving an acknowledgement message returned by the central node, and notifies the central node of an IP address of the reserved MDU resource; at last, the edge node enables the MDU resource, sends a media stream requesting message to the central node, and stores data of the relay channel after receiving an acknowledgement message returned by the central node, then the relay channel is successfully established. The method for establishing a relay channel is convenient and fast to relieve problems of overload and low efficiency of the central node and better balance the load of each node in the network, thereby allocating and using the system resource more properly.

The invention is described below in detail with reference to the drawings and preferred embodiments. It should be understood that the preferred embodiments herein are only intended to illuminate and explain the invention instead of limiting the invention.

In the case that there is no conflict, the embodiments of the invention and the features therein can be combined with each other.

Figure 1:
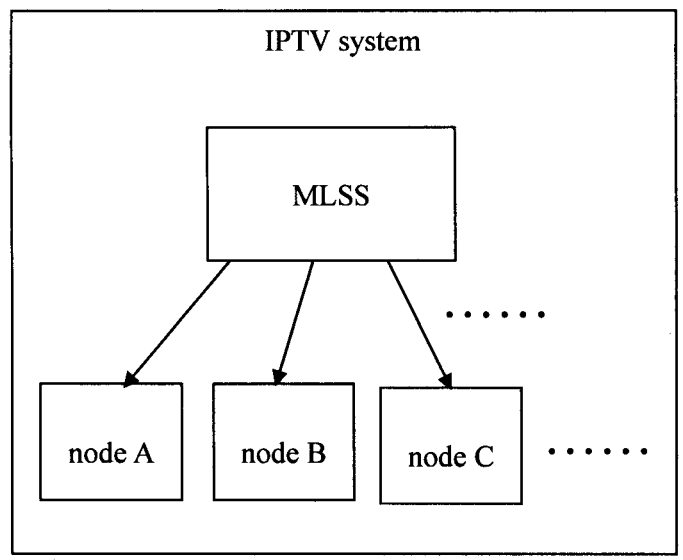
FIG. 1 is a structure block diagram of an IPTV system.
Figure 2:
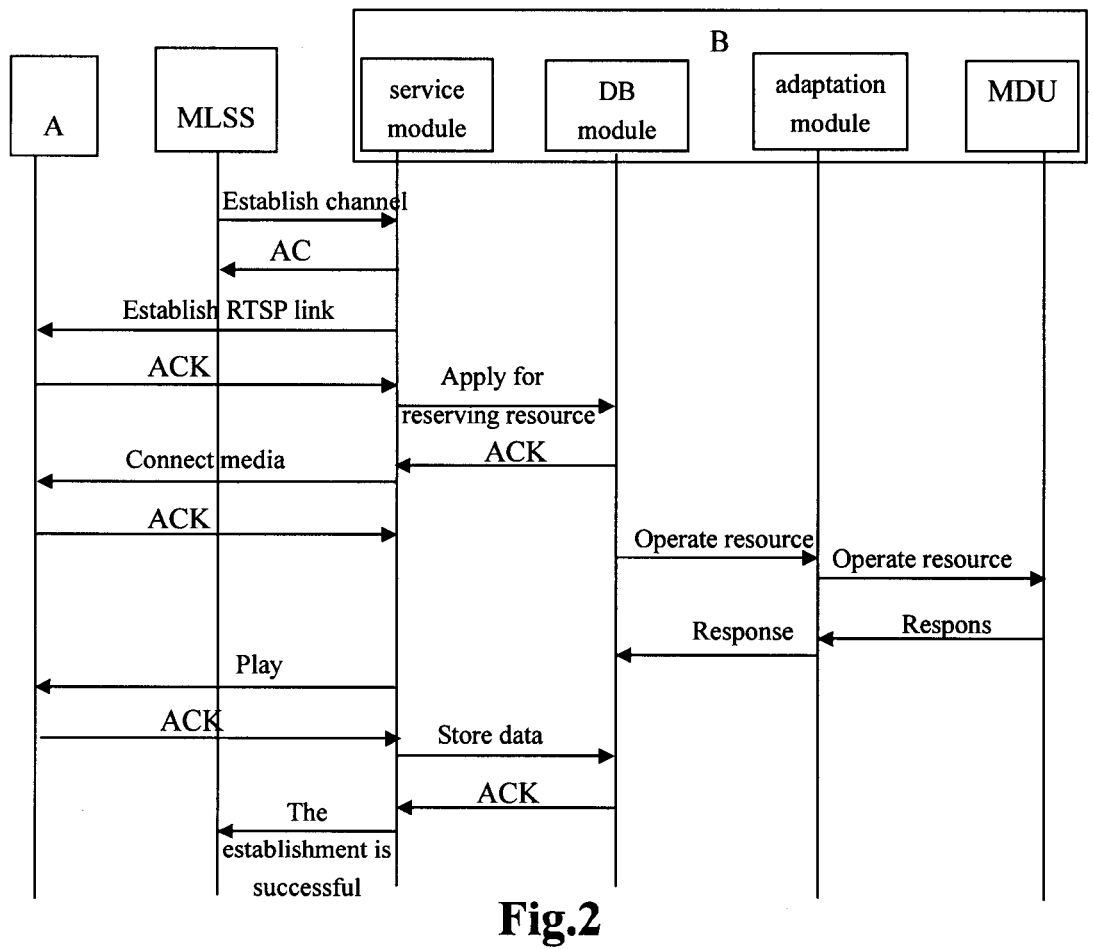
FIG. 2 is a signalling interaction diagram of the method of an embodiment of the present invention.

As shown in FIG. 2, it is assumed that an IPTV system has two nodes: USS A and USS B. The MLSS determines, when monitoring that the number of orders for one channel on the central node USS A is more than a predetermined first threshold, the node is in a heavy load. Meanwhile, when the MLSS finds that the number of orders of the edge node USS B is less than a predetermined second threshold, the MLSS sends a message to USS B to request USS B to establish a channel from USS A in an RTSP way. After the channel is established successfully, USS B disguises as a set-top box (STB) to register on USS A, such that in the view of USS A, only one user is added, but in fact, the media stream is successfully introduced from USS A to the MDU of USS B through the relay channel, so as to reduce the load of USS A. The specific flow includes the following steps (Steps 1 to 17).

Step 1: The MLSS sends a channel establishing request to USS B.

Step 2: After receiving the request, a service module of USS B sends an acknowledgement (ACK for short) message of the channel establishing request to the MLSS.

Step 3: The service module of USS B sends an RTSP link establishing request to USS A.

Step 4: After receiving the request, USS A returns an acknowledgement (ACK) message of establishing an RTSP link, that is, USS A agrees to establish the RTSP link.

Step 5: The service module of USS B sends a request for applying the reservation of an MDU resource to the database module of USS B.

Step 6: After receiving the request, the database module of USS B reserves the corresponding MDU resource, and returns an acknowledgement (ACK) message of the request for applying the reservation of an MDU resource.

Step 7: The service module of USS B sends a setup media request to USS A, and notifies USS A of the IP address of the reserved MDU resource, that is, this address is the media receiving address of USS B.

Step 8: After receiving the address, USS A records the IP address, and returns an acknowledgement (ACK) message of the setup media request.

Step 9: The service module of USS B sends a request for operating the reserved MDU resource to the adaptation module of USS B, to request to enable the resource.

Step 10: The adaptation module of USS B operates the MDU resource, i.e. enables the resource.

Step 11: The MDU of USS B sends an acknowledgement (ACK) message of operating the resource to the adaptation module of USS B to notify the adaptation module of successful operation on the resource.

Step 12: The adaptation module of USS B sends an acknowledgement (ACK) message of operating the resource to the service module of USS B to notify the service module of successful operation on the resource.

Step 13: The service module of USS B sends a play request to USS A, to request USS A to send the media stream to the MDU with the specified IP address.

Step 14: After receiving the message, USS A returns an acknowledgement (ACK) message of the play request, and starts to send the media stream to the MDU with the IP address specified by USS B.

Step 15: After receiving the ACK message returned by USS A, the service module of USS B sends a request for storing data to the database module of USS B.

Step 16: After receiving the message, the database module of USS B stores data corresponding to the established channel, and returns an acknowledgement (ACK) message of the request for storing data.

Step 17: After receiving the ACK message from the database module of USS B, the service module of USS B sends a message of establishing channel successfully to the MLSS.

According to one embodiment of the invention, a system for implementing a relay channel is also provided.

The system for implementing a relay channel according to the embodiment of the present invention includes: an MLSS, an edge node and a central node, in which the MLSS is configured to monitor the number of orders of all nodes of an Internet Protocol television (IPTV) system, and, when monitoring the number of orders of a central node of the IPTV system is more than a predetermined first threshold, search for an edge node with the number of orders less than a predetermined second threshold, and sending a relay channel establishing request message to the edge node;

the edge node is configured to receive the relay channel establishing request message, send an RTSP link establishing request message to the central node, reserve a media distribute unit (MDU) resource for the link after receiving an acknowledgement message returned by the central node, notify the central node of an IP address of the reserved MDU resource, enable the MDU resource, send a media stream requesting message to the central node, and store data of the relay channel after receiving an acknowledgement message returned by the central node; and the central node is configured to receive the RTSP link establishing request message, return an acknowledgement message of the RTSP link establishing request message to the edge node, receive the IP address of the reserved MDU resource sent by the edge node, and return an acknowledgement message to the edge node after receiving the media stream requesting message.

Specifically, the edge node above includes: a database module, a service module, an adaptation module and a media distribution module (unit), in which the database module is configured to reserve the MDU resource, and acquire the IP address of the reserved MDU resource;

the service module is configured to send an MDU resource enabling request message to an adaptation module;

the adaptation module is configured to enable the MDU resource, and return, after receiving an acknowledgement message returned by an MDU to which the MDU resource belongs, an acknowledgement message to the service module to notify the service module of successful enabling of the corresponding MDU resource; and the MDU to which the MDU resource belongs is configured to return the acknowledgement message to the adaptation module to notify the adaptation module of the successful enabling of the corresponding resource.

To sum up, the method for implementing a relay channel provided by the embodiment of the invention establishes a relay channel conveniently and quickly to relieve problems of overload and low efficiency of the central node and better balance the load of each node in the network, thereby allocating and using the system resource more properly.

It should be understood that those skilled in the art can improve or change the invention according to the description of the solutions above, for example, other demassification and detailing methods performed by using other user property, and such improvements and changes should belong to the scope of protection of the appended claims of the invention.

According to another aspect of the embodiment of the invention, an edge node is further provided.

If the number of orders of the edge node is less than a predetermined second threshold, the edge node according to an embodiment of the present invention includes:

a module configured to receive a relay channel establishing request message from a media location service system (MLSS), wherein the relay channel establishing request message is sent when the MLSS monitors that the number of orders of a central node of an Internet Protocol television (IPTV) system is more than a predetermined first threshold; a module configured to send an RTSP link establishing request message to the central node; a module configured to reserve a media distribute unit (MDU) resource for the link after receiving an acknowledgement message returned by the central node in response to the RTSP link establishing request message; a module configured to notify the central node of an IP address of the reserved MDU resource; a module configured to enable the MDU resource; a module configured to send a media stream requesting message to the central node; and a module configured to store data of the relay channel after receiving an acknowledgement message returned by the central node in response to the media stream requesting message.

The invention claimed is:

1. A method for implementing a relay channel, in which a media location service system (MLSS) monitors the number of orders of all nodes of an Internet Protocol television (IPTV) system, wherein when the MLSS monitors that the number of orders of a central node is more than a predetermined first threshold, the following steps are executed:

step 1: the MLSS searching for edge nodes with the number of orders less than a predetermined second threshold, and sending a relay channel establishing request message to one of the edge nodes;

step 2: the edge node which receives the relay channel establishing request message sending an RTSP (Real Time Streaming Protocol) link establishing request message to the central node, reserving a media distribute unit (MDU) resource for the link after receiving an acknowledgement message returned by the central node, and notifying the central node of an IP address of the reserved MDU resource; and Step 3: the edge node enabling the MDU resource, sending a media stream requesting message to the central node, and storing data of the relay channel after receiving an acknowledgement message returned by the central node, then the relay channel being successfully established;

wherein in step 3, the edge node enables the MDU resource by the following steps:

step a: a service module of the edge node sending an MDU resource enabling request message to an adaptation module of the edge node;

step b: the adaptation module enabling the MDU resource, and an MDU to which the MDU resource belongs returning an acknowledgement message to notify the adaptation module of successful enabling of the corresponding resource; and step c: the adaptation module returning an acknowledgement message to the service module to notify the service module of successful enabling of the corresponding MDU resource.

2. The method for implementing a relay channel according to claim 1, wherein in step 2, after receiving the acknowledgement message returned by the central node, the edge node applies to a database module of the edge node for reserving the MDU resource, and the database module reserves the MDU resource for the edge node and returns an acknowledgement message carrying the IP address of the reserved MDU resource.

3. The method for implementing a relay channel according to claim 1, wherein between steps 2 and 3, the method further comprises:

the central node returns the acknowledgement message to the edge node after receiving the notification from the edge node.

4. The method for implementing a relay channel according to claim 3, wherein in step 3, after receiving the media stream requesting message from the edge node, the central node returns the acknowledgement message, and at the same time, starts to send a media stream to an MDU corresponding to the IP address notified by the edge node.

* * * * *